Nov. 24, 1970    G. H. MOREY ET AL    3,543,004
ELECTRIC HEATING MANTLE WITH A SEAL ARRANGEMENT FOR VESSEL
Filed April 15, 1968                    2 Sheets-Sheet 1
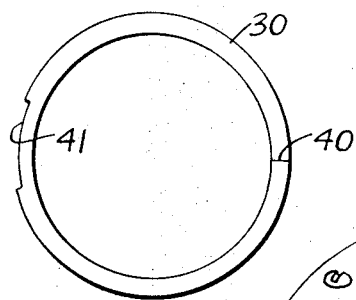
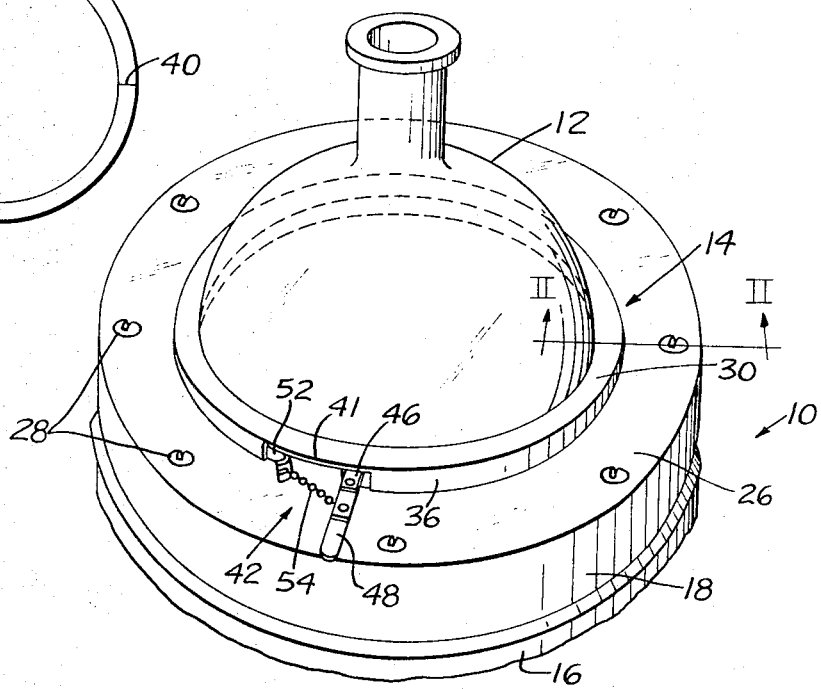
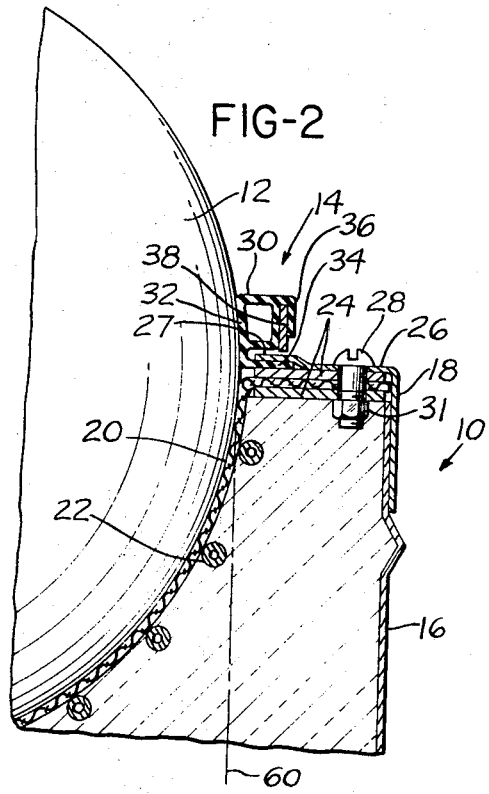
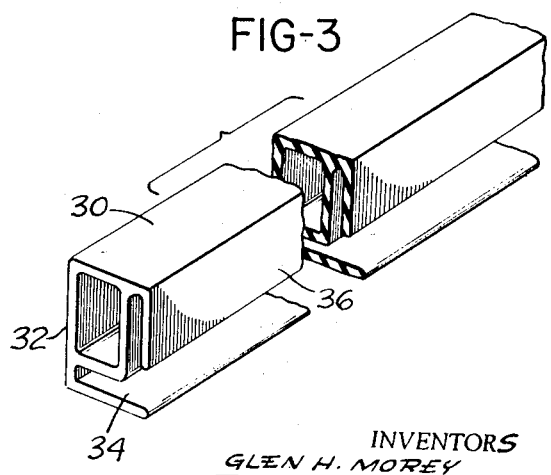
INVENTORS
GLEN H. MOREY
RAYMOND E. RICKERT
BY

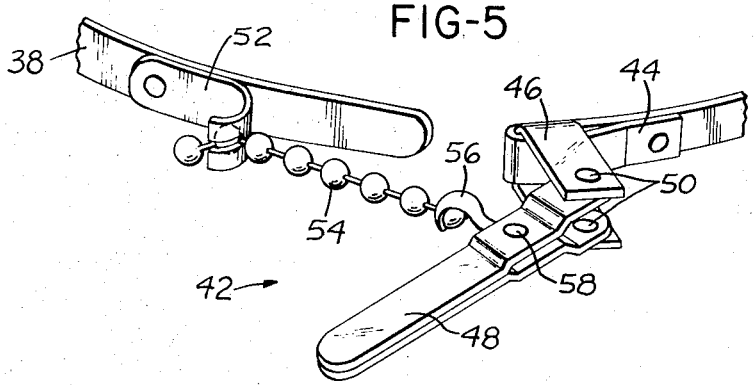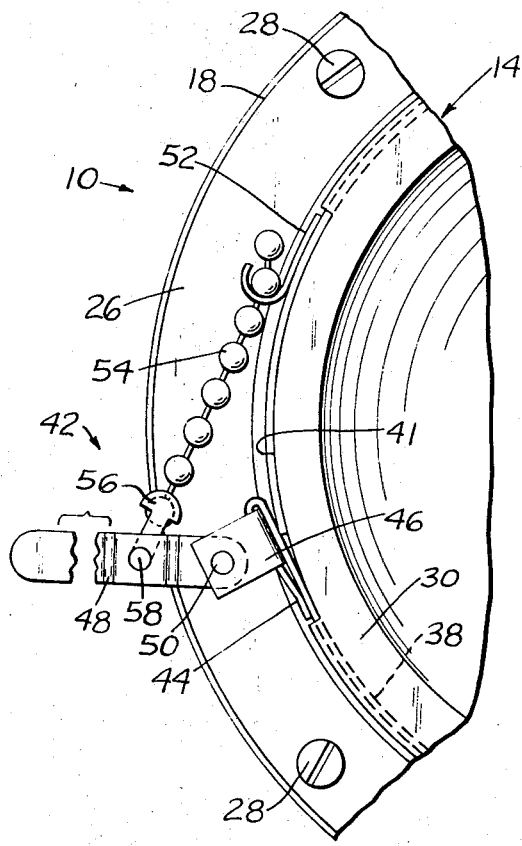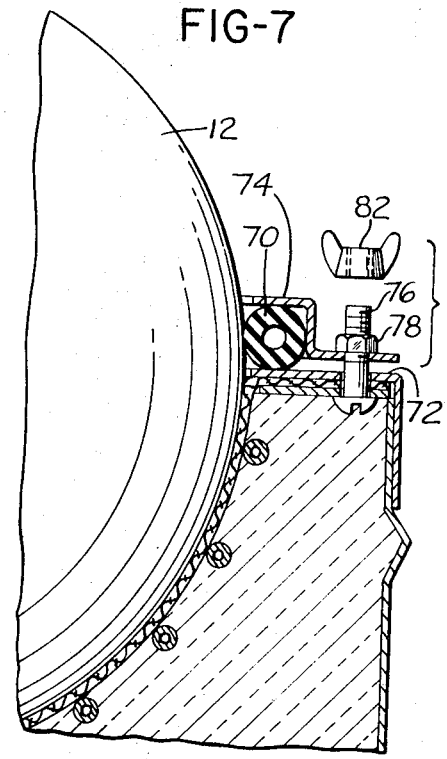

United States Patent Office 3,543,004
Patented Nov. 24, 1970

3,543,004
ELECTRIC HEATING MANTLE WITH A SEAL ARRANGEMENT FOR VESSEL
Glen H. Morey and Raymond E. Rickert, Terre Haute, Ind., assignors to Templeton Coal Company, Terre Haute, Ind., a corporation of Indiana
Filed Apr. 15, 1968, Ser. No. 721,399
Int. Cl. F27d 11/02
U.S. Cl. 219—433                             8 Claims

ABSTRACT OF THE DISCLOSURE

Heating mantle for heating flasks and beakers and similar vessels, in which the vessel to be heated is introduced into the top of the heating mantle and is supported therein by a fabric support which carries resistance heating element means and wherein the heating mantle has a resilient sealing band extending about the opening through which the vessel is introduced and with means provided for adjustably compressing resilient sealing ring radially inwardly into engagement with the vessel to effect a fluid tight seal between the vessel and the opening of the heating mantle.

---

The present invention relates to electric heating mantles for flasks and beakers and similar vessels and is particularly concerned with a method and apparatus for sealing between the frame of the heating mantle and the vessel being heated thereby to prevent danger from boil over or spillage of liquids.

Heating mantles of the type with which the present invention is concerned are well known and comprise a metal frame having a fabric support therein for receiving a flask or a beaker or the like and with electric resistance heating element means secured to the outer surface of the fabric and with the frame being filled with heat insulating material such as glass wool or the like. The metal frame is generally cylindrical in configuration and there is a hole in the top wall through which the vessel to be heated is introduced and the fabric support for the vessel to be heated is connected at its periphery about the opening and extends downwardly into the frame and has the configuration of the vessel so that it engages the surface of the vessel that is disposed in the heating mantle. Heating mantles for flasks normally engage about the lower half of the spherical portion of the flask while the heating mantles for beakers will engage up to one-half or more of the length of the beaker.

There has always been difficulty, on occasion, with liquids boiling over out of the vessels, or spillage occurring upon supply liquids to the vessels while they are supported in the mantle and, when this occurs, the liquid can readily run down the side of the vessel and pass into the inside of the heating mantle between the outer surface of the vessel being heated and the periphery of the opening in which the vessel is placed. It is of disadvantage for any liquid to get into the heating mantle, and in some cases, the liquid may be corrosive and damage, or even destroy, the heating mantle and, in other cases, the liquid may be flammable or explosive and a dangerous condition can be created by the liquid getting down into the heating mantle. In still other cases, the liquid may produce vapors which are toxic or poisonous and this, of course, represents a severe hazard to workers and technicians in the vicinity.

Having the foregoing in mind, the primary objective of the present invention is the provision of a method and apparatus for sealing a vessel to a heating mantle of the nature referred to so that there is no chance of any liquid getting down into the heating mantle either from boil over or spillage or for any other reason.

Still another object of this invention is the provision of a simple device that can be incorporated in new manufacture and also supplied for existing heating mantles and which is operable for effecting a fluid tight seal between a vessel being heated in a heating mantle and the frame of the heating mantle.

Still another object of this invention is the provision of a sealing arrangement of the nature referred to which can readily be released so that it does not interfere in any way with the removal of the vessel being heated from the mantle, or the adjustment of the vessel in the mantle.

Still another feature of this invention is the provision of a seal arrangement of the nature referred to which can readily be adjusted to accommodate for vessels of slightly varying size that might be placed in the heating mantle.

The foregoing objects, as well as still other objects and advantages of the present invention, will become more apparent upon reference to the following detailed specification, taken in connection with the accompanying drawings in which:

FIG. 1 is a fragmentary perspective view showing a portion of a heating mantle according to the present invention with a flask therein and showing a sealing device according to the present invention on the heating mantle.

FIG. 2 is a fragmentary vertical sectional view indicated by line II—II on FIG. 1 drawn at enlarged scale and showing more in detail the arrangement of the sealing device on the heating mantle and its relationship to the flask.

FIG. 3 is a perspective view showing a member from which the resilient portion of the sealing device is made.

FIG. 4 is a plan view showing the member of FIG. 3 formed into a ring preparatory to mounting the ring on the heating mantle.

FIG. 5 is a fragmentary perspective view drawn at somewhat enlarged scale showing an adjustable compressing band forming a part of the seal structure of the present invention.

FIG. 6 is a fragmentary plan view drawn at enlarged scale and showing the sealing device assembled with the heating mantle and with the compressing band and showing the band in release position, and;

FIG. 7 is a fragmentary view similar to FIG. 2 but showing another type seal according to the present invention.

The present invention, in brief, contemplates mounting a resilient rubber-like member about the opening of a heating mantle into which a vessel to be heated is placed and providing an arrangement for compressing the member about the vessel being heated into sealing engagement therewith. The rubber-like member is sealingly connected to the heating mantle so that when it is also compressed into sealing engagement with the vessel in the heating mantle, the interior of the heating mantle is sealed from the ingress of liquids. The resilient rubber-like member is preferable made of a silicone-rubber or an elastomeric plastic which will withstand temperatures that might be encountered in the operation of the heating mantle so that the sealing arrangement will remain effective for a long period of time.

Referring to the drawings somewhat more in detail, in FIG. 1, 10 generally indicates a heating mantle, 12 indicates a flask being heated therein, and 14 generally indicates a seal according to the present invention which is carried by the heating mantle and which is adapted for sealing engagement with the outer surface of the flask.

The heating mantle comprises a metal frame which may have a cylindrical outer wall 16 and telescopically fitted over the top thereof is an angular ring member 18 (FIG. 2) which closes the top of the heating mantle about the periphery and also defines a central opening in the heating mantle into which flask 12 is placed.

As will be seen in FIG. 2, the heating mantle has a fabric support member 20 therein which may consist of one or more layers of rather loosely woven glass, quartz, or asbestos yarns and to the outside of which is stitched electric resistance heating element means 22. In FIGS. 1 and 2 the support formed by fabric 20 is substantially hemispherical so as supportingly to engage the bottom portion of the flask 12. The peripheral portion of fabric 20 extends radially outwardly and is clamped between a pair of metal rings 24. These rings are disposed between the top flange 26 of ring 18 and are clamped together with the peripheral portion of fabric 20 therebetween and fixed to the underside of flange 26 of ring 18 by the screws 28 which have nuts 31 on their lower ends.

According to the present invention, there is a resilient rubber-like ring member 30 surrounding flask 12 immediately above the opening in ring 18. Member 30 consists of a substantially rectangular hollow part 32 and extending radially outwardly from the radially inner lower end thereof is a lip 34 that is clamped between the underside of the inner edge of top flange 26 of ring 18 and the inner portion of the upper one of metal rings 24. The inner periphery of flange 26 may be offset upwardly as at 27 to receive lip 34. The seal member also has a dependent lip 36 depending from the radially outer upper corner thereof and this lip, together with the body of the ring member 30, defines a channel about the resilient member into which clamping band 38 can be placed. When the clamping band 38 is released, so it expands radially, flask 12 can easily be introduced into the heating mantle or removed therefrom. However, when clamping band is drawn up, the resilient annular seal member is compressed radially inwardly against the periphery of flask 12 and forms a fluid tight sealing engagement therewith.

Turning to FIG. 3, it will be seen that the seal member 30 is made up by taking a predetermined length of an extruded member of the desired configuration, and then forming the member to a circular configuration, as shown in FIG. 4, and cementing the ends together at 40. The lip 36 extends axially downwardly on the radially outer side of member 30 when the member is formed into a ring, and lip 34 will be at the bottom and will extend radially outwardly. Lip 36 is cut out over a portion of its length, as shown at 41 in FIG. 4, and also will be seen in FIG. 1, so as to receive the actuating mechanism being generally indicated at 42 in FIG. 1.

FIG. 5 shows more in detail the actuating mechanism 42. In FIG. 5 it will be seen that one end of band 38 is folded back on itself at 44 to form a holder for bracket member 46 in which it is pivotally supported lever 48. Lever 48 is pivoted on an axis defined by rivet means 50 which connect it to bracket 46.

The other end of band 38 has riveted thereto a hook-like member 52 which has a slot in its hook-like end so that it will detachably engage a selected ball of a ball chain 54. Ball chain 54 at its end opposite hook-like member 52 is connected to lever 48 as by fitting 56 of a known type that is pivoted to lever 48 by rivet 58. It will be apparent from FIG. 5, that movement of lever 48 in a counter-clockwise direction will draw the ends of band 38 toward each other thereby causing the resilient member 30 between the band and the flask to be compressed radially inwardly against the flask. It will also be apparent that the compressed size of the band can be adjusted by removing ball chain 54 from hook-like member 52 and placing another ball thereof in engagement with the hook-like member 52 whereby the sealing arrangement can be adapted to flask of at least slightly differing sizes.

It will be evident, in FIG. 5, that the end of lever 48 which is pivoted to bracket 46 is open so that the fitting 56 and ball chain 54 can be received therebetween so that when the lever is moved to its closed position, the lever will be either over center or so close to center that the pressure of resilient member 30 on the band 38 will not be effective for pulling the lever back toward its open position.

FIG. 6 shows more in detail the manner in which the band engages the resilient annular member 30 and how the outer lip 36 of the resilient annular member is cut out at 41 to accommodate the actuating mechanism for the band.

The description above has pertained to a substantially spherical flask but it will be evident that the seal arrangement is useful for substantially any type of vessel. For example, for the heating of beakers the fabric 20 would be formed to a cylindrical configuration as shown by the dot-dash line 60 in FIG. 2 and while this would accommodate the heating mantle to a cylindrical vessel, such as a beaker, no change at all would be required in the sealing arrangement.

FIG. 7 shows a modification in which the resilient ring-like sealing member is in the form of tubing 70 which is captive between the upper surface of the top ring 72 of the heating mantle and angular retaining member 74 which engages the top and radially outer sides of tubing 70. Member 74 is held in place by the screws 76 having nuts 78 thereon. It will be apparent, from FIG. 7, that the nuts 78 can be adjusted so that the vessel 80, preferably a flask, would be a close fit within resilient sealing 70 so that the sealing 70 could be adjusted to a certain position and left in that position and this would permit the flask to be introduced into the heating mantle and be removed therefrom but would provide a seal therefor while the heating mantle is in the flask.

However, the nuts 78 can be adjusted to vary the compression on ring 70 to cause it to extend to a greater or lesser degree toward the vessel and the heating mantle thereby to vary the sealing pressure if necessary due to a change in the size of a vessel or to insure a tighter seal. The nuts 78 could readily be replaced by wing nuts 82 if so desired, thus making it more convenient to effect the adjustment of the compression of ring 70 if so desired.

From the foregoing it will be seen that the present invention provides a simple but highly effective method and apparatus for sealing a vessel to an electric heating mantle so as completely to prevent any liquid from getting into the heating mantle from the top while the vessel is in position therein. The invention provides for adjustment of the compression of the sealing arrangement to adjust it to vessels of varying sizes and also to permit the vessel easily to be introduced into or removed from the heating mantle while tightly sealing the vessel to the mantle during a work operation.

The arrangement of the present invention is relatively inexpensive but is highly effective and can be adapted to existing heating mantles as well as being incorporated in new manufacture.

It will be understood that this invention is susceptible to modification in order to adapt it to different usages and conditions; and accordingly, it is desired to comprehend such modifications within this invention as may fall within the scope of the appended claims.

What is claimed is:

1. In combination with a heating mantle for flasks and beakers and like vessels, said mantle having a rigid frame with an opening in the top to receive the vessel to be heated therein, said heating mantle also comprising a textile-like member suspended therein from the periphery of said opening adapted to engage and support vessels introduced into said mantle through said opening, electric resistance heating element means attached to said textile-like member, wires for supplying energy to said resistance heating means and leading therefrom through a wall of said frame, heating insulating means in said frame surrounding said textile-like member and the heating element thereon, means for sealing a vessel to said frame comprising; a seal element in the form of a resilient hollow annular member mounted on top of the frame of the heating mantle in surrounding relation to the said opening in the top of the frame and into which a vessel to be heated is introduced into the mantle whereby the radially inner side of said annular member is presented to a peripheral region of said vessel, compressing means surrounding said seal element on at least the radially outer side thereof, and means selectively operable for actuating said compressing means for compressing the said seal element so as to cause it to deform in the radially inward direction into sealing engagement with said peripheral region of said vessel.

2. A sealing arrangement according to claim 1 in which said compressing means comprises a ring-like member engaging the seal element on top and on the radially outer side, the frame of said mantle engaging the bottom of the seal element while the radially inner side of the seal element is exposed for engagement with said vessel, and means connecting the ring-like member to the frame of said mantle and adjustable to draw the ring-like member toward the frame of the mantle thereby to compress said seal element and cause it to be deformed in the radially inward direction.

3. A sealing arrangement according to claim 1 in which said seal element has a lip extending therefrom on the frame side and sealingly clamped to the frame of said heating mantle to locate the seal element on the mantle and to seal the seal element to the mantle.

4. A sealing arrangement according to claim 1 in which said compressing means comprises a band in the form of a length of substantially inextensible material surrounding said seal element, and having its opposite ends in adjacent relation, said means for reducing the diameter of said compressing means comprising lever means connected to said ends of said length and operable for moving said ends of said band relative to each other in the peripheral direction of said band.

5. In combination; an electric heating mantle having a rigid frame with an opening in the top to receive the lower end of a vessel to be heated by the mantle, and said mantle comprising a textile-like member suspended therein from about the periphery of said opening to embrace the lower end of the vessel and having electric resistance heating means thereon to supply heat to the vessel, wires leading into the mantle to supply energy to said heating means, heat insulation in the frame surrounding said textile-like member and the heating means thereon, a hollow annular ring of resilient rubber-like material mounted on the top of said frame and surrounding said opening, said ring in unstressed condition being substantially as large in diameter as a vessel to be heated in said mantle so as not to interfere with movement of the vessel through said opening, and means for compressing said ring to cause radially elastic deformation thereof into sealing engagement with the peripheral portion of said vessel which is near the plane of said opening, and means for maintaining a seal between said ring and said frame at least during the time that said ring is compressed.

6. A seal arrangement for a heating mantle for flasks and beakers and like vessels, said mantle having a rigid frame with an opening in the top to receive the vessel to be heated therein, said mantle comprising a textile-like member suspended therein from about the periphery of said opening to embrace the lower end of the vessel and having electric resistance heating means thereon to supply heat to the vessel, wires leading into the mantle to supply energy to said heating means, heat insulation in the frame surrounding said textile-like member and the heating means thereon, said seal arrangement comprising; a seal element in the form of a resilient annular element adapted for being sealingly mounted on the frame of the heating mantle about the opening therein into which the vessel to be heated is introduced into the mantle, compressing means associated with said seal element and operable for compressing the said seal element so as to cause it to deform in the radially inwardly direction and into sealing engagement with a said vessel in said opening, said sealing element being hollow so as to be readily deformable into sealing engagement with a vessel, said sealing element having a first lip extending therefrom on the frame side and sealingly clamped to the frame of the heating mantle to locate the seal element on the mantle and to seal the seal element to the mantle, said seal element having a second lip dependent from the upper radially outer region thereof, and said compressing means comprising a band surrounding said seal element and adjustable in length to vary the degree of radially inward deformation of said seal element, said band being disposed in the space inside said second lip.

7. A sealing arrangement according to claim 6 in which said band is in the form of a thin strip with the ends thereof brought into adjacent relation, a lever pivoted to one of said ends, and a link connected between said lever and a point along the band near the other end thereof.

8. A sealing arrangement according to claim 7 in which said second lip is interrupted in the region of the ends of said band to expose said lever and link.

References Cited
UNITED STATES PATENTS

| | | | |
|---|---|---|---|
| 2,643,324 | 6/1953 | Goldstaub | 219—535 X |
| 3,177,343 | 4/1965 | Morey | 219—433 |
| 3,177,344 | 4/1965 | Morey | 219—433 |
| 3,233,907 | 2/1966 | Stanton | 277—178 X |
| 3,246,793 | 4/1966 | Wade | 277—187 X |
| 3,310,329 | 3/1967 | Luker | 220—46 X |

FOREIGN PATENTS

| | | |
|---|---|---|
| 950,659 | 2/1964 | Great Britain. |
| 952,521 | 3/1964 | Great Britain. |

VOLODYMYR Y. MAYEWSKY, Primary Examiner

U.S. Cl. X.R.

219—436, 535; 220—46; 277—178, 189